United States Patent [19]

Goldberg

[11] 4,288,503
[45] * Sep. 8, 1981

[54] LAMINATED MICROPOROUS ARTICLE

[75] Inventor: Bruce S. Goldberg, Clifton, N.J.

[73] Assignee: Amerace Corporation, New York, N.Y.

[ * ] Notice: The portion of the term of this patent subsequent to May 6, 1997, has been disclaimed.

[21] Appl. No.: 41,511

[22] Filed: May 24, 1979

Related U.S. Application Data

[63] Continuation-in-part of Ser. No. 915,916, Jun. 16, 1978, Pat. No. 4,201,838.

[51] Int. Cl.³ .............................................. H01M 2/16
[52] U.S. Cl. ................................... 429/145; 428/283; 428/284; 428/287; 428/297; 428/298; 428/304; 428/308
[58] Field of Search ............... 429/144, 145, 252, 253, 429/254; 428/283, 284, 287, 296, 304, 305, 308, 320, 331, 904, 290, 297, 298, 306; 156/309

[56] References Cited

U.S. PATENT DOCUMENTS

| 2,344,614 | 3/1944 | Hulse | 429/252 |
| 2,772,322 | 11/1956 | Witt et al. | 429/252 |
| 3,418,198 | 12/1968 | Emstman | 428/287 |
| 3,779,855 | 12/1973 | Fonzi | 428/904 |
| 3,811,957 | 5/1974 | Bunten | 429/254 |
| 3,871,938 | 3/1975 | Takahasi et al. | 428/904 |
| 4,201,838 | 5/1980 | Goldberg | 428/283 |

Primary Examiner—James J. Bell
Attorney, Agent, or Firm—Fred A. Keire; Richard A. Craig

[57] ABSTRACT

A laminated microporous article consisting of at least two layers or plies, the first comprising either a thermoset or thermoplastic microporous material and the second comprising a polyester non-woven, heat bonded (in distinction to adhesive bonded) web. The resulting laminated microporous article is especially useful as a battery separator and exhibits superior properties including improved electrical resistance, toughness and tear strength, and flexibility.

9 Claims, 3 Drawing Figures

LAMINATED MICROPOROUS ARTICLE

This application is a continuation-in-part application of U.S. patent application Ser. No. 915,916, filed June 16, 1978 now U.S. Pat. No. 4,201,838.

The present invention relates generally to microporous articles made of polymeric materials, and more specifically to an improved laminated microporous article especially useful as a battery separator.

As is known in the art, battery separators comprise thin sheets or layers of material disposed between adjacent plates in a wet-cell storage battery for the purpose of preventing electrical shorts between the plates occasioned by touching or dendritic growth, or festooned about each plate to prevent shorts due to plate spalling. Generally speaking, in addition to being acid resistant, battery separators should be porous and have voids or pores as small as possible, preferably on the order of less than two microns for example, and should be as thin as possible so as to afford minimal electrical resistance. Also, battery separators should have good strength characteristics to facilitate handling including good puncture resistance and should have sufficient toughness to resist cracking when being folded to form envelopes or sleeves.

One well-known form of battery separator comprises a microporous sheet-like article of thermostat material such as rubber. This separator is made by compounding together a rubber polymer, a sulfur curative, silica, and various processing aids; calendering the compound to form a web of predetermined size; and then vulcanizing the web in an autoclave. A more detailed teaching of the compounds and techniques used in making such thermo-set or rubber microporous separators may be found in U.S. Pat. Nos. 2,329,322 (Baty et al) and 2,274,260 (Schelhammer et al).

Another well known form of battery separator comprising a microporous sheet-like article of thermoplastic material such as polyvinyl chloride resin is made by mixing together a PVC resin, silica, and a solvent; extruding the mixture into a calender to form a sheet of solvent laden resin/silica; and then extracting the solvent in a water or steam bath. Here again, more detailed teachings of the compounds and techniques employed in making such thermoplastic microporous separators may be found in U.S. Pat. Nos. 2,772,322 (Witt et al) and 3,696,061 (Selsor et al).

Although the aforementioned microporous polymeric battery separators have achieved commercial acceptance they still suffer the disadvantage of being relatively brittle. As a result, care must be taken during fabrication and handling; and it is difficult to avoid cracking the material when the separator material is folded into envelopes or sleeves. If the separator is folded carefully so as not to cause cracks, sometimes the folded separator material catches on the corner of an electrode plate resulting in an unwanted puncture of the separator material.

In an effort to solve the foregoing embrittlement problem and to impart increased toughness to the separator, it has been proposed to laminate a porous backing member to the microporous separator. Thus, for example, in U.S. Pat. No. 3,298,869 (Swoboda) there is described a process for laminating a resin impregnated paper to a rubber microporous separator body. While such laminated constructions admittedly produce a separator having increased toughness and flexibility, it has been found that the resin impregnated paper backing tends to increase the overall electrical resistance of the resulting separator, and the paper backing leaves something to be desired with regard to its resistance to acids. Other battery separator constructions are known which comprise impregnated woven fabrics, however, these require completely new processes to fabricate and thus, are quite capital intensive.

Against the foregoing background, it is a principal object of the present invention to provide a laminated microporous article especially suitable for use as a battery separator and which possesses improved physical properties with regard to its intended use.

It is yet another object of the present invention to provide a laminated microporous article especially suitable for use as a battery separator and which possesses improved physical properties with regard to an unlaminated battery separator of the same microporous material and of equivalent thickness.

It is still yet another object of the present invention to provide a laminated microporous article especially suitable for use as a battery separator and which possesses improved properties with respect to electrical resistance, toughness, flexibility, burst strength, and acid resistance.

Toward the accomplishment of the foregoing objects and advantages the present invention briefly summarized comprises a laminated microporous article consisting of at least two layers or plies, the first comprising either a thermoset or thermoplastic microporous material and the second comprising a polyester non-woven, heat bonded (in distinction to adhesive bonded) web. The web may be fed into a conventional two-roll calender simultaneously with the extruded microporous precursor compound to produce a laminated sheet, or alternatively, the web may be laminated to the microporous precursor layer in a three-roll calender so as to achieve more precise control over the thickness of the microporous layer and to avoid squirming between the microporous layer and the backing web. In either case, the resulting laminated microporous article exhibits superior properties including improved electrical resistance, toughness and tear strength, and flexibility, rendering the article especially advantageous and suitable for use as a battery separator.

Additional objects and advantages as well as a more complete understanding of the present invention will be made more apparent from a study of the following detailed description of the present invention in connection with the accompanying drawings wherein.

Figure 1:
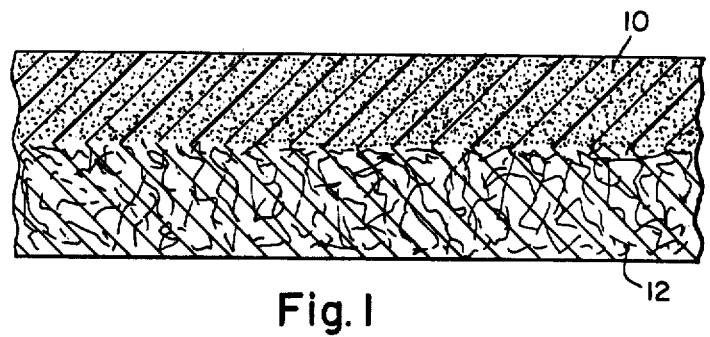
FIG. 1 is a schematic illustration of the cross-section of the laminated microporous article of the present invention.

Turning now to FIG. 1 there is schematically shown a laminate comprising a first layer or ply 10 and a second layer or ply 12. The first layer 10 comprises a microporous polymeric material which may be either thermoplastic or thermoset. If thermoplastic, the first layer could be prepared as described, for example, in the aforementioned U.S. Pat. Nos. 2,772,322 (Witt et al) and 3,696,061 (Selsor et al) which patents are hereby incorporated herein by this reference. In brief, a thermoplastic plastic resin is mixed together with a silica filler and a solvent, such as cyclohexanone. The silica may be in the form of silica hydrogel (Witt et al), or may be in the form of precipitated dehydrated silica in which case suitable quantities of non-solvent (e. g. water) are added to the mix (Selsor et al). The mixture is then fed into an extruder which opens through a suitable die into the nip of a calender to form a thin sheet of solubilized resin/silica which, in turn, is passed through an extraction bath to leach out the solvent and form the micropores therein. The sheet is then dried and cut to size.

If the thermoset microporous material is chosen for the first layer 10, the latter may be prepared as described in, for example, the aforementioned U.S. Pat. Nos. 2,329,322 (Baty et al) and 2,274,260 (Schelhammer et al) which patents are hereby incorporated herein by this reference.

When employing silica as the micropore former, typically the micropores in the microporous material are less than two microns; more commonly, the average pore size is less than one micron. The amount of silica employed provides the desired microporosity. However, the amount of silica employed does not exceed that which would cause the thermoplastic or thermoset material to fail, such as by brittle failure. While for a given material there is a practical amount, it is highly desirable to obtain the most flexible material at a silica loading level which provides acceptable porosity.

In general, a thermosettable rubber polymer is compounded together with a sulfur curative and/or other vulcanizing ingredients, rehydrated silica, and various stabilizers and processing aids and fed into an extruder to form a continuous sheet of desired thickness. At the calender a backing web of paper is introduced to provide support for the calendered sheet and prevent distortion thereof during vulcanization. The sheet with its paper backing web is then wound on a reel of convenient size and transferred to an autoclave for curing. After curing, the paper backing web is removed from the resulting valcanized microporous rubber sheet.

When the foregoing microporous thermoplastic or thermoset sheet articles are employed as battery separators, they typically have physical properties within the ranges indicated in TABLE I.

TABLE I
PHYSICAL PROPERTIES OF UNBACKED BATTERY SEPARATORS

| PHYSICAL PROPERTY | PLASTIC | RUBBER |
|---|---|---|
| Thickness, mils (Backweb)* | 10–40 | 20–40 |
| Tensile Strength, psi | 160–560 | 650–1100 |
| Elongation, % | 7–55 | 2–10 |
| Mullen, psi | 35–65 | 25–75 |
| Electrical Resistance, m$\Omega$ in$^2$/mil | .9–1.6 | 1.2–2.5 |
| Wt. Loss in Chromic Acid, % | max. 4 | max. 35 |

*Backweb thickness herein is meant as the thickness of either plastic or rubber material with its backing in the non-ribbed portion of the separator.

In accordance with the above values, for the presently disclosed composite, the thickness may be from 10 mils (2 mils of the microporous layer and 8 of the polyester web). Although thicker webs may be employed, as a general rule, a thinner web for the same purpose is more desirable. Typically upper range for the separators may be as high as 40 mils (backweb). However, a thickness of about 20 mils would be more than sufficient for a battery separator when using the presently described composite because a microporous layer of a thickness from 5 to 8 mils can be readily achieved.

In accordance with the present invention, the second layer or ply 12 comprises a 100% polyester non-woven, heat bonded (in distinction to adhesive bonded) web. This web material should consist of staple fibers entangled to form a strong, unbonded structure and should not have any resin binders or interfiber bonds. The fibers should be free to bend and move past one another as the fabric is flexed, thereby providing excellent softness (hand) and draping characteristics. Since the web is to be employed as a backing in a battery separator, it should have strength characteristics, acid resistance, and electrical resistance equal to or better than traditional battery separator materials. The reason for the desirable characteristics is that the backweb should have these characteristics but these are not obtainable from these traditional materials. If the backing material improves these properties in the composite, it then in combination with the microporous layer allows thinner microporous layers at equal strength properties or improves flexibility for the same thickness. A thinner microporous layer reduces resistance but increases brittle failure even with a backing material. Moreover, the backing material does not "work" in unison with the microporous layer in the composite and if unduly thin microporous layers are used such as those made of rubber, these develop cracks during curing or upon flexing of the composite.

An especially suitable web which cooperates with the microporous layer and of the type described above has been found. It is available from DuPont & Co. under the trademark Sontara 8000. The latter has fibers about 0.8 inches long, a grab break strength of 25/13 lb. (machine direction-MD/cross direction-XD) measured by ASTM Method D-1682-64, elongation of 40/100% (machine direction-MD/cross direction-XD) and is available in webs having a nominal thickness with the range of about 8–12 mils, and an average weight of 1.2 oz/yd$^2$. (These are typical average values.) Other typical property values for this material are:

| Grab Breaking Strength (lbs.) | MD 20–30 | XD 12–18 |
|---|---|---|
| Grab Breaking elongation (%) | MD 25–50 | XD 50–120 |
| Weight (oz./yd.$^2$) | 1.2–2.2 | |
| Mullen Burst (lbs.) | 30–40 | |
| Tongue Tear (lbs./in.) | about 2.1 MD and about 3.1 XD | |

Such webs have been found to have an electrical resistance of about 0.25 m$\Omega$ in$^2$/mil which is quite surprising. Generally speaking, an electrical resistance of about 1 m$\Omega$ in$^2$/mil is considered excellent. A very important advantage of property which has been discovered as being possessed by this web (in distinction from a number of other webs) is its flexibility in combination such as with rubber, i.e. thermoset (crosslinked) materials. This web has the proper flexibility and "give" with the rubber material when it cures. Apparently, the non-bonded fibers "slide" easily over each other, the same is not true for adhesive bonded webs.

These advantageous properties in the composite are attributable especially due to the elongation properties of the polyester web. Hence, a web which possesses the elongation values of 25 to 50% in machine direction, 50 to 120% in cross direction, while being resistant to acid and having the other physical properties, can function properly in the battery. The composite is thus improved by the above described Sontara 8000 (TM) backing. Also, the composites of the microporous material and the backing web cooperate in a proper manner to afford thinner composites, which do not fail in brittle failure, e.g. brittle cracking, are more flexible and puncture resistant, possess an assured porosity (without the problems encountered when attempting to use thin microporous layer in accordance with the practices of the prior art).

The above backing material has been especially advantageous for sulfur cured microporous rubber separators although by no means limited to that material.

Figure 2:
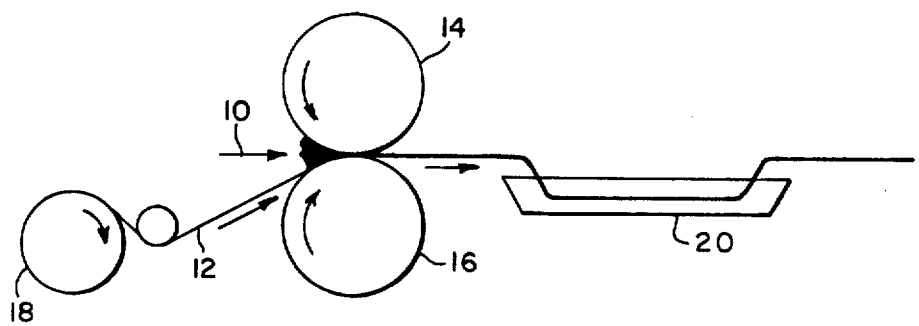
FIG. 2 is a diagramatic illustration of a preferred method of laminating the article of FIG. 1.

In forming the laminate of FIG. 1, the preferred apparatus of FIG. 2 may be employed. An extruder (not shown) feeds a continuous sheet of solubilized thermoplastic resin/silica compound or vulcanizable rubber/-silica compound into the nip of a calender as indicated by arrow 10. The calender which comprises a pair of rotating rolls 14, 16 has a bight equal to the desired separator thickness. Fed simultaneously and continuously into the nip of the calender is the polyester non-woven web 12 supplied from spool 20. The two layers 10, 12 are laminated together by the action of rolls 14, 16 and resulting laminate (if layer 10 is thermoplastic) is then fed into a water bath schematically indicated by reference numeral 20 to leach the solvent from the layer 10.

If, on the other hand, layer 10 is thermosettable, instead of the water bath 20, there will be provided a take-up spool or reel upon which the laminate is wound (not shown in FIG. 2, but see FIG. 3), the spool then being transferred to an autoclave for vulcanizing the rubber polymeric constituent of the laminate. The laminate is then dried forming the micropores therein and cut to size.

Figure 3:
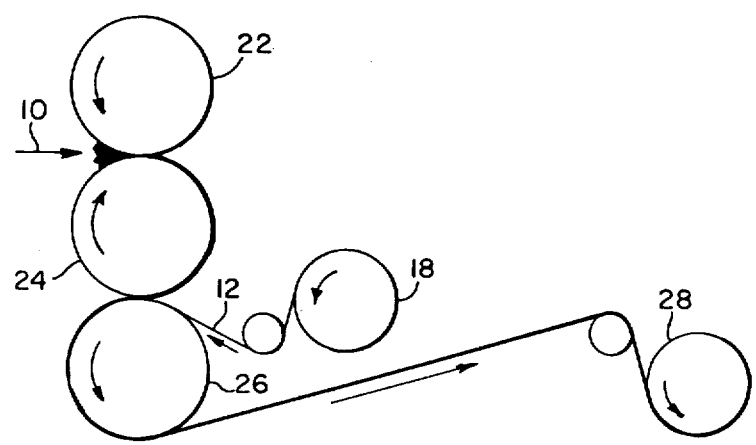
FIG. 3 is a diagramatic illustration of an alternatively preferred method of laminating the article of FIG. 1.

In certain cases, as where a more precise control over the thickness dimension of the microporous layer 10 is desired, the three-roll calender apparatus of FIG. 3 may alternatively be employed. Such a three-roll calender is further advantageous for the reason that the backing web 12 is fed into the nip of the second pair of rollers against a relatively thinner layer 10 of the microporous material and thus "squirming" or relative shifting of the two layers in the nip is avoided. Thus, as shown in FIG. 3, the extrudate comprising a continuous sheet of microporous precursor compound (identified by reference numeral 10) is fed into the nip between the first two rolls 22, 24 of a three-roll calender to continuously form a sheet or the layer 10 of reduced desired thickness. This reduced size sheet or layer 10 is then fed simultaneously into the nip between the second pair of rolls 24, 26 with the polyester non-woven backing web 12 supplied from spool 18. If layer 10 is thermoplastic, the laminated sheet 10 may be fed to a water bath (see FIG. 2), or if layer 10 is thermoset, to a take-up spool or reel 28 for subsequent transfer to a vulcanizer or autoclave as shown in FIG. 3. It will be appreciated that in the case where layer 10 is thermoset microporous, the backing web 12 takes the place of the conventional paper web used to prevent distortion of the polymeric microporous layer during cure; however, in distinction to the conventional use of the paper backing web, the polyester non-woven web of the present invention is not separated or removed after cure, but remains an integral constituent of the resulting microporous article.

The following specific Examples further illustrate the present invention and are not to be construed as limitations thereof.

EXAMPLE I

The procedure set forth in the aforementioned U.S. Pat. No. 3,696,061 (Selsor et al) was followed to mix a masterbatch of a damp, flowable powder blend from the following ingredients PVC resin (Diamond 450) 20 lbs., precipitated dehydrated silica (Hi-Sil 233) 40 lbs., cyclohexanone 50 lbs., and water 58 lbs., with the exception that 12 lbs. of dioctyl phthalate plasticizer were mixed with PVC resin before the other ingredients were added to the low shear blender. The damp, flowable powder was then fed into an extruder having a barrel temperature of 145° F. to form a continuous extruded stream of solubilized resin/silica of doughy consistency. The latter was then applied through a horizontal spreading die into the nip of a two-roll calender to produce a thin sheet which was subsequently passed through a water bath at a temperature of 180° F. to extract the solvent. From the water bath the sheet was transferred to an air oven at 225° F. for 20 minutes and then cut into small samples of about 6 inches × 6 inches. The samples which had a nominal thickness (backweb) of 18 mils were then tested with the following results:

| Test | Result |
| --- | --- |
| Tensile, psi | 200 |
| Elongation, % | 50 |
| Mullen, psi | 60 |
| Electrical Resistance, mΩ in$^2$/mil | 1.0 |
| Wt. Loss in Chromic Acid, % | less than 3 |

EXAMPLE II

The procedure of EXAMPLE I was repeated, however, a web of Sontara 8000 polyester non-woven, nominally 8–12 mils thick, was simultaneously fed into the nip of the calender with the extruded sheet to form a laminated sheet. The latter was then passed through the extraction bath, air oven, and cut to sample size as in EXAMPLE I. The laminated samples were tested with the following results:

| Test | Result |
| --- | --- |
| Tensile, psi | 2500 |
| Elongation, % | 17 |
| Mullen, psi | 110 |
| Electrical Resistance, mΩ in$^2$/mil | 0.90 |
| Wt. Loss in Chromic Acid, % | less than 2 |

EXAMPLE III

A masterbatch of the following ingredients was compounded together on a Banbury mixer: natural rubber 100 parts, synthetic rubber (SBR) 18.71 parts, sulfur 46.67 parts, rehydrated silica 207.00 parts, (Hi-Sil 233, 136.47 parts water), plasticizer oil (Sunpar 150) 7.56 parts, stearic acid 1.0 part, and accelerator (diphenyl guanadine) 1.0 part. The masterbatch compound was dropped from the Banbury and processed into slabs in a strip mill. The slabs were then preheated to about 150° F. on a roll mill and fed by hand into a three-roll calender. Also fed into the three-roll calender was a paper backing web. The resulting paper-backed calendered sheet was then wound on a reel and cured in an autoclave at 365° F. for 3 minutes, then dried to produce a thermoset microporous sheet having a nominal thickness (backweb) of 28 mils with the paper backing web removed. The microporous sheet was cut to sample size (6"×6") and tested as follows:

| Test | Result |
| --- | --- |
| Tensile, psi | 1000 |
| Elongation, % | 10 |
| Mullen, psi | 70 |
| Electrical Resistance, mΩ in²/mil | 1.42 |
| Wt. Loss in Chromic Acid, % | 25 |

EXAMPLE IV

The procedure of EXAMPLE III was followed except that instead of a web of paper, a web of Sontara 8000 polyester non-woven was fed into the nip of the lower two rolls on the three-roll calender to produce a laminated sheet. The laminated sheet was coiled on a reel and vulcanized under the same conditions as EXAMPLE III. The resulting laminate comprising a thermoset microporous layer and a polyester non-woven layer had a nominal thickness of 25 mils and was cut to sample size and tested as follows:

| Test | Result |
| --- | --- |
| Tensile, psi | 1200 |
| Elongation, % | 14 |
| Mullen, psi | 82 |
| Electrical Resistance, mΩ in²/mil | 1.00 |
| Wt. Loss in Chromic Acid, % | 18 |

It will be observed from a comparison of EXAMPLES I and II that the thermoplastic microporous article having the polyester non-woven web laminated thereto in accordance with the present invention has significantly improved tensile strength and Mullen burst thus rendering the article highly resistant to tear and/or puncture. Inasmuch as the polyester non-woven web has per se surprisingly low electrical resistance, the overall electrical resistance of the laminate has been reduced. Use of the laminated web does not appear to affect acid resistance and, in fact, improves this slightly. Inasmuch as a DOP plasticizer was added to the microporous precursor compound of EXAMPLE I, the resulting microporous article had good flexibility to begin with, and therefor, the measured elongation of the laminated sample is actually reduced. It is believed, however, that the use of the laminated web would render unbacked samples of non-plasticized thermoplastic microporous material more flexible. This is confirmed by comparing the results of EXAMPLES III and IV and observing the improvement in elongation from 10% to 14%. Also note, the quite excellent improvement in tensile strength, Mullen burst strength, electrical resistance and acid resistance achieved by laminating the polyester non-woven to the thermoset microporous material.

As a result of the foregoing, the laminated microporous articles disclosed herein may advantageously be employed as battery separators wherein the microporous layer is significantly thinner than heretofore possible without the backing web of the present invention. In general, laminated battery separators may be fabricated having a web thickness nominally within the range of about 8 mils to about 12 mils and may have a microporous layer thickness as little as 2 mils, but which may be considerably greater. Prior unbacked separators have a thickness usually within the range of about 15 mils to about 40 mils. Battery separators which have thinner microporous layers are considerably more flexible than unbacked, thicker separators and, therefore, when laminated with the polyester non-woven web as taught herein, may easily be folded without cracking. Moreover, since such laminated separators have significantly increased tensile and mullen burst strength, accidental puncturing of the folded separator during plate insertion may be avoided.

The present invention should be limited only by the spirit and scope of the appended claims.

I claim:

1. As an article of manufacture, a laminated microporous article combination comprising a first layer of microporous material, wherein the micropores are substantially all of a size of about 2 microns and less and a layer thickness of 2 mils and greater and a second layer of porous backing material laminated to said first layer, said second layer comprising a heat-bonded fibrous polyester non-woven web of a thickness of about 8 mils and greater and an electrical resistance, in a battery acid electrolyte, of about 0.25 mΩ in²/mil, said laminate having a total thickness of about 10 to 40 mils for a backweb of a microporous layer and said backing material, said non-woven web having a grab breaking strength of 20 to 30 lbs. in machine direction and 12 to 18 lbs in cross direction, a grab breaking elongation, from 25 to 50 percent in machine direction and 50 to 120 percent in cross direction, with a Mullen burst value of 30 to 40 lbs.

2. The invention of claim 1 wherein said first layer of microporous material is selected from the group consisting of a thermoplastic microporous material or a thermoset microporous material.

3. The invention of claim 2 wherein said thermoplastic microporous material comprises polyvinyl chloride having particles of silica filler therein.

4. The invention of claim 2 wherein said thermoset microporous material comprises vulcanized rubber having particles of silica filler therein.

5. The invention of claim 1 wherein said polyester non-woven web has an electrical resistance about 0.25 mΩ in²/mil.

6. The invention of claim 1 wherein the microporous layer of said laminated article has a thickness of about 2 mils or greater.

7. As an article of manufacture, a battery separator of the laminate as defined in claim 1.

8. As an article of manufacture, a battery separator of a laminate, as defined in claim 1, whereby the same has improved tensile strength, puncture resistance, and electrical resistance when compared to a battery separator of the same material as said microporous layer and having the same thickness as said laminated article.

9. The article of manufacture as defined in claim 1 wherein said non-woven web is of a nominal thickness between 8 and 12 mils and resistance in said electrolyte of about 1 mΩ/in² in said electrolyte, said laminate having a microporous layer of at least 2 mils thickness with a micropore size of about 2 microns and less.

* * * * *